(12) United States Patent
Li et al.

(10) Patent No.: US 10,109,225 B2
(45) Date of Patent: Oct. 23, 2018

(54) PANEL FUNCTION TEST CIRCUIT, DISPLAY PANEL, AND METHODS FOR FUNCTION TEST AND ELECTROSTATIC PROTECTION

(71) Applicants: Boe Technology Group Co., Ltd., Beijing (CN); Ordos Yuansheng Optoelectronics Co., Ltd., Inner Mongolia (CN)

(72) Inventors: Fuqiang Li, Beijing (CN); Cheng Li, Beijing (CN); Seongjun An, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 461 days.

(21) Appl. No.: 14/500,433

(22) Filed: Sep. 29, 2014

(65) Prior Publication Data

US 2015/0339959 A1    Nov. 26, 2015

(30) Foreign Application Priority Data

May 23, 2014    (CN) .......................... 2014 1 0222852

(51) Int. Cl.
*G09G 3/00* (2006.01)
*H02H 1/00* (2006.01)
*G09G 3/36* (2006.01)

(52) U.S. Cl.
CPC ........... *G09G 3/006* (2013.01); *H02H 1/0007* (2013.01); *G09G 3/36* (2013.01); *G09G 2330/04* (2013.01); *G09G 2330/06* (2013.01)

(58) Field of Classification Search
CPC ................. H01L 22/34; H01L 27/0207; H01L 2225/06596; G01R 31/31922
(Continued)

(56) References Cited

U.S. PATENT DOCUMENTS 7,679,396 B1 * 3/2010 Kao ............... H03K 19/018578
326/27
2005/0285827 A1 * 12/2005 Eom ..................... G09G 3/3233
345/76

(Continued)

FOREIGN PATENT DOCUMENTS

CN    1766722        5/2006
CN    1877666       12/2006
(Continued)

OTHER PUBLICATIONS

Office action from Chinese Application No. 201410222852.5 dated Jan. 4, 2016.
(Continued)

*Primary Examiner* — Melissa Koval
*Assistant Examiner* — Trung Nguyen
(74) *Attorney, Agent, or Firm* — Calfee, Halter & Griswold LLP (57) ABSTRACT

A panel function test circuit is able to perform a function test when a display panel is in a first state and is able to perform electrostatic protection when the display panel is in a second state, whereby the display panel requires fewer components and less wiring space.

12 Claims, 5 Drawing Sheets

(58) Field of Classification Search
USPC ... 324/760.01–762.03, 500, 600, 727, 76.49, 324/508, 76.35, 76.54
See application file for complete search history.

(56) References Cited

U.S. PATENT DOCUMENTS

| | | | |
|---|---|---|---|
| 2005/0285984 A1 | 12/2005 | Tsai et al. | |
| 2006/0226872 A1* | 10/2006 | Ishii | G09G 3/3648 326/81 |
| 2006/0279667 A1 | 12/2006 | Tsai et al. | |
| 2015/0206476 A1* | 7/2015 | Qi | G09G 3/3233 345/76 |

FOREIGN PATENT DOCUMENTS

| | | |
|---|---|---|
| CN | 1897094 | 1/2007 |
| CN | 1941370 | 4/2007 |
| CN | 101004490 | 7/2007 |
| CN | 101097673 | 1/2008 |
| CN | 101221330 | 7/2008 |
| CN | 102967973 | 3/2013 |
| CN | 203849977 | 9/2014 |
| JP | 2005274932 | 10/2005 |

OTHER PUBLICATIONS

Office action from Chinese Application No. 201410222852.5 dated May 20, 2016.
Notice of Reexamination for China Application No. 201410222852.5 dated Aug. 28, 2017.
Examination Decision for China Application No. 201410222852.5 dated Oct. 30, 2017.
Office Action from China Application No. 201410222852.5 dated Jan. 9, 2017.
Examination Decision for China Application No. 201410222852.5 dated Nov. 15, 2017.

* cited by examiner

PANEL FUNCTION TEST CIRCUIT, DISPLAY PANEL, AND METHODS FOR FUNCTION TEST AND ELECTROSTATIC PROTECTION

RELATED APPLICATIONS

The present application claims the benefit of Chinese Patent Application No. 201410222852.5, filed May 23, 2014, the entire disclosure of which is incorporated herein by reference.

FIELD

The present disclosure relates to the field of liquid crystal display and particularly to a panel function test circuit, a display panel, and methods of providing for a function test and electrostatic protection.

BACKGROUND

For characteristics like small volume, low power consumption, free of radiation, etc., Thin Film Transistor Liquid Crystal Display (TFT-LCD) technology has developed rapidly in recent years and has become prevalent in current flat-panel displays. At present, the TFT-LCD technology is widely used in various sized products including small, medium, and large products, covering a broad spectrum of modern electronic products, such as a liquid crystal television, a high-definition digital television, a computer (desktop and laptop), a cell phone, a tablet, a GPS, a vehicle-mounted display, a projection display, a video camera, a digital camera, an electronic watch, a calculator, an electronic instrument, a meter, a public display, a virtual display, and so on.

At present, a production line of a TFT-LCD display panel is divided into four main working sections, i.e., Array, Color Filter (CF), Cell, and Module.

The Array section relates to the manufacture of a TFT array substrate, having a focus on the manufacture of signal lines of metal layers and individual pixel capacitor units on the TFT array substrate.

The CF section relates to the manufacture of a Black Matrix (BM) layer, an RGB layer, a transparent electrically conductive layer, etc. on the CF substrate.

The Cell section relates to adhering the TFT array substrate and the CF substrate to one another by using a seal to form an integrated and closed panel (liquid crystal screen), which mainly includes the steps of printing a rubbing film, aligning the rubbing film, dripping liquid crystal, curing with the seal, etc. In the Cell section, after a large glass substrate (motherboard glass) is fittingly adhered, it is cut to result in smaller pieces of liquid crystal screen units, and then a Cell Test is performed for the liquid crystal screen units. The Cell Test aims at detecting defects, which mainly include mura, block, cell stain, bright line, and so on, of the liquid crystal screen units appearing in the Array and Cell sections. Generally, the display panel needs to be provided with a panel function test circuit for the Cell Test.

The Module section mainly includes assembling the manufactured liquid crystal screen units, on which a polarizer and a PCB drive circuit have been affixed, with a backlight to form a final finished display module product.

When the display panel works normally, a phenomenon of Electrostatic Discharge also exists. Electrostatic Discharge is a major factor in causing electronic assemblies and electronic systems to suffer Electrical Overstress damage, which may lead to permanent destruction of semiconductor devices, thus resulting in functional failure of the integrated circuit. Therefore, the display panel further needs to be provided with an electrostatic protection circuit for use during operation of the display panel, wherein the electrostatic protection circuit often connects electrically with a signal line of the display panel.

Since both a panel function test circuit and an electrostatic protection circuit need to be provided, respectively, more wiring space is required.

SUMMARY

An object of the present invention is to provide a panel function test circuit, a display panel, and methods of providing for a function test and electrostatic protection, which can eliminate or at least mitigate one or more of the above problems, such as the need for more wiring space.

An exemplary embodiment of the present invention provides a panel function test circuit including a first subcircuit and a second subcircuit connecting electrically with the same data line of a display panel. The first subcircuit and the second subcircuit are configured to provide a test signal for the data line of the display panel in a test state, or to perform electrostatic discharge of an electrostatic signal transferred through the data line of the display panel in a work state.

Because the panel function test circuit may also serve as an electrostatic protection circuit of the display panel in the subsequent work state, the functionality of two circuits, i.e., a panel function test circuit and an electrostatic protection circuit, is implemented by one circuit without additional elements, so that the number of components and the occupied wiring space are reduced.

According to an exemplary embodiment, the first subcircuit is configured to provide the test signal for the data line through its third terminal based on a first control signal accessed through its first terminal and a first test signal accessed through its second terminal, or for performing discharge for a high level electrostatic signal transferred through the data line and received through its third terminal based on a second control signal accessed through its first terminal and a first level signal accessed through its second terminal. The second subcircuit is configured to provide the test signal for the data line through its third terminal based on the second control signal accessed through its first terminal and a second test signal accessed through its second terminal, or for performing discharge for a low level electrostatic signal transferred through the data line and received through its third terminal based on the first control signal accessed through its first terminal and a second level signal accessed through its second terminal.

In this embodiment, both the first subcircuit and the second subcircuit may provide the test signal for the function test when the display panel is in the test state and may also serve, respectively, as a positive electrostatic discharge circuit and a negative electrostatic discharge circuit when the display panel is in the work state.

According to another exemplary embodiment, the first subcircuit includes a first transistor, and the second subcircuit includes a second transistor. A gate of the first transistor is the first terminal of the first subcircuit, a source of the first transistor is the second terminal of the first subcircuit, and a drain of the first transistor is the third terminal of the first subcircuit. A gate of the second transistor is the first terminal of the second subcircuit, a source of the second transistor is the second terminal of the second subcircuit, and a drain of the second transistor is the third terminal of the second subcircuit.

In this embodiment, since the first subcircuit is the first transistor and the second subcircuit is the second transistor, the circuit can be easily implemented and has a simple structure.

According to yet another exemplary embodiment, the first transistor is a PMOS transistor, and the second transistor is an NMOS transistor.

According to still another exemplary embodiment, the first control signal is a low level signal, and the second control signal is a high level signal; and the first level signal is a high level signal, and the second level signal is a low level signal.

An exemplary embodiment of the present invention provides a display panel including a plurality of data lines and a panel function test circuit as described above.

The exemplary embodiments of the present invention provide various advantages by combining a panel function test circuit and an electrostatic protection circuit, wherein the panel function test circuit provides the test signal when a function test is performed for the display panel and provides electrostatic protection when the display panel is at work, thus reducing the overall number of components needed and saving wiring space.

An exemplary embodiment of the present invention further provides a function test method for a display panel, which adopts a panel function test circuit as described above and includes: inputting a first control signal through a first terminal of the first subcircuit, inputting a first test signal through a second terminal of the first subcircuit, and providing the test signal for the data line of the display panel through a third terminal of the first subcircuit; and/or, inputting a second control signal through a first terminal of the second subcircuit, inputting a second test signal through a second terminal of the second subcircuit, and providing the test signal for the data line of the display panel through a third terminal of the second subcircuit.

According to an exemplary embodiment, the first subcircuit is a PMOS transistor, and the steps of inputting the first control signal through the first terminal of the first subcircuit, inputting the first test signal through the second terminal of the first subcircuit, and providing the test signal for the data line of the display panel through the third terminal of the first subcircuit correspond to inputting the first control signal through a gate of the PMOS transistor, inputting the first test signal through a source of the PMOS transistor, and providing the test signal for the data line of the display panel through a drain of the PMOS transistor, respectively.

According to another exemplary embodiment, the second subcircuit is an NMOS transistor, and the steps of inputting the second control signal through the first terminal of the second subcircuit, inputting the second test signal through the second terminal of the second subcircuit, and providing the test signal for the data line of the display panel through the third terminal of the second subcircuit correspond to inputting the second control signal through a gate of the NMOS transistor, inputting the second test signal through a source of the NMOS transistor, and providing the test signal for the data line of the display panel through a drain of the NMOS transistor.

According to yet another exemplary embodiment, the first control signal is a low level signal, and the second control signal is a high level signal.

The exemplary embodiments of the present invention are advantageous as a result of the panel function test circuit having function test and electrostatic protection functionality, and both the first subcircuit and the second subcircuit may provide the test signal when the function test is performed for the display panel, such that there is no need to provide a separate panel function test circuit, thus reducing the overall number of components needed and saving wiring space.

An exemplary embodiment of the present invention also provides an electrostatic protection method for a display panel, which adopts a panel function test circuit as described above and includes: inputting a second control signal for controlling switch-off of the first subcircuit of the panel function test circuit through a first terminal of the first subcircuit, and inputting a first level signal through a second terminal of the first subcircuit; inputting a first control signal for controlling switch-off of the second subcircuit through a first terminal of the second subcircuit, and inputting a second level signal through a second terminal of the second subcircuit; and performing, by the first subcircuit or the second subcircuit, electrostatic discharge for an electrostatic signal, upon arrival of the electrostatic signal transferred through the data line.

According to an exemplary embodiment, the first subcircuit is a PMOS transistor, and the second subcircuit is an NMOS transistor; the first control signal is a low level signal, and the second control signal is a high level signal; and the first level signal is a high level signal, and the second level signal is a low level signal.

According to another exemplary embodiment, the step of performing, by the first subcircuit or the second subcircuit, electrostatic discharge of the electrostatic signal, when the electrostatic signal transferred through the data line arrives includes: performing, by the first subcircuit, electrostatic discharge of the electrostatic signal, if the electrostatic signal is a high level electrostatic signal, and the level of the electrostatic signal is higher than the level of the second control signal; and performing, by the second subcircuit, electrostatic discharge of the electrostatic signal, if the electrostatic signal is a low level electrostatic signal, and the level of the electrostatic signal is lower than the level of the first control signal.

The exemplary embodiments of the present invention are advantageous as a result of the panel function test circuit having function test and electrostatic protection functionality, and the first subcircuit and the second subcircuit can provide, respectively, positive electrostatic discharge and negative electrostatic discharge when the display panel is at work, such that there is no need to provide a separate electrostatic protection circuit, thus reducing the overall number of components and saving wiring space.

DETAILED DESCRIPTION

Implementation of various exemplary embodiments of the present invention is described in detail in the following description and the accompanying drawings. It is to be noted that the same or similar reference signs throughout represent the same or similar elements or elements with the same or similar functions. The embodiments described below by reference to the accompanying drawings are exemplary and provided merely for the purpose of explaining the present invention and should not be construed as limiting to the general concepts of the present invention as described and suggested herein.

For the consideration of improving yield of display panels (e.g., TFT-LCD display panels), various tests are performed during the production of the display panel. Generally, a plurality of display panels are formed as one production cell wherein the display panels are a single unit before being cut. A Cell Test is performed by the panel function test circuit before the display panels are cut. When cut into separate display panels, each separated display panel needs an electrostatic protection circuit for ensuring it works in a stable state. Therefore, conventionally, the panel function test and the electrostatic protection have been implemented by two distinct circuits, which requires more space for the components and wiring associated with each circuit. In order to solve problems arising from this conventional approach, the present disclosure provides a panel function test circuit, a display panel, and methods of providing for a function test and electrostatic protection.

Figure 1:
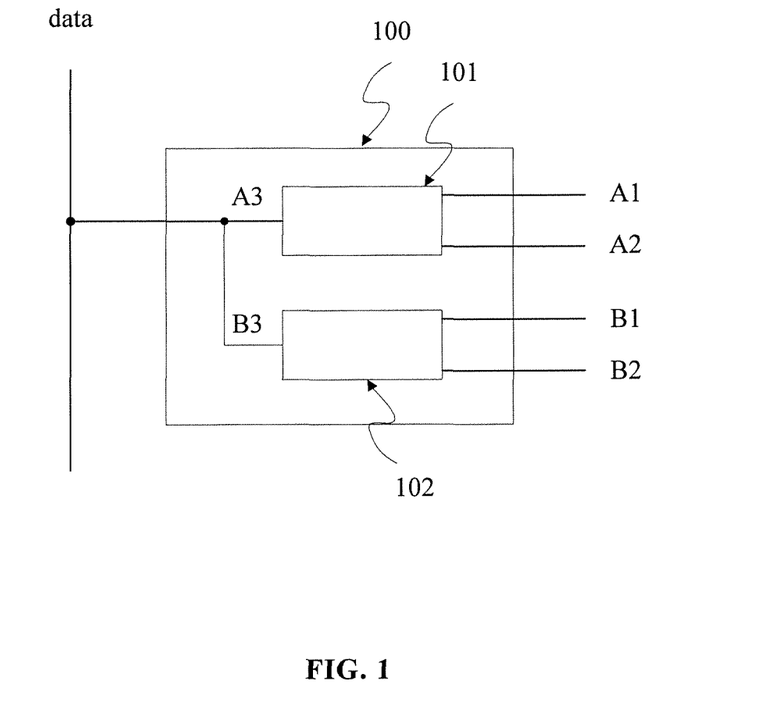
FIG. 1 is a schematic diagram of the general structure of a panel function test circuit according to an exemplary embodiment.

Referring to FIG. 1, a panel function test circuit 100, according to an exemplary embodiment, includes a first subcircuit 101 and a second subcircuit 102, each connected electrically with the same data line data of a display panel. The first subcircuit 101 and the second subcircuit 102 are configured to provide a test signal for the data line of the display panel in a test state, or to perform electrostatic discharge of an electrostatic signal transferred through the data line of the display panel in a work state.

In an exemplary embodiment of the present invention, the panel function test circuit 100 may serve as an electrostatic protection circuit of the display panel in the subsequent work state, wherein the functionality of these two circuits, i.e. a panel function test circuit and an electrostatic protection circuit, are implemented by one circuit (i.e., the panel function test circuit 100) without requiring additional elements, such that the overall number of needed components and the occupied wiring space are reduced.

According to an exemplary embodiment, the first subcircuit 101 is configured to provide the test signal for the data line through its third terminal A3 based on a first control signal accessed through its first terminal A1 and a first test signal accessed through its second terminal A2, or for performing discharge of the electrostatic signal transferred through the data line and received through its third terminal A3 based on a second control signal accessed through its first terminal A1 and a first level signal accessed through its second terminal A2.

The second subcircuit 102 is configured to provide the test signal for the data line through its third terminal B3 based on the second control signal accessed through its first terminal B1 and a second test signal accessed through its second terminal B2, or for performing discharge of the electrostatic signal transferred through the data line and received through its third terminal B3 based on the first control signal accessed through its first terminal B1 and a second level signal accessed through its second terminal B2.

In this exemplary embodiment, both the first subcircuit 101 and the second subcircuit 102 may provide the test signal for the function test of the display panel in the test state, and may also serve, respectively, as a positive electrostatic discharge circuit and a negative electrostatic discharge circuit when the display panel is in the work state.

Figure 2:
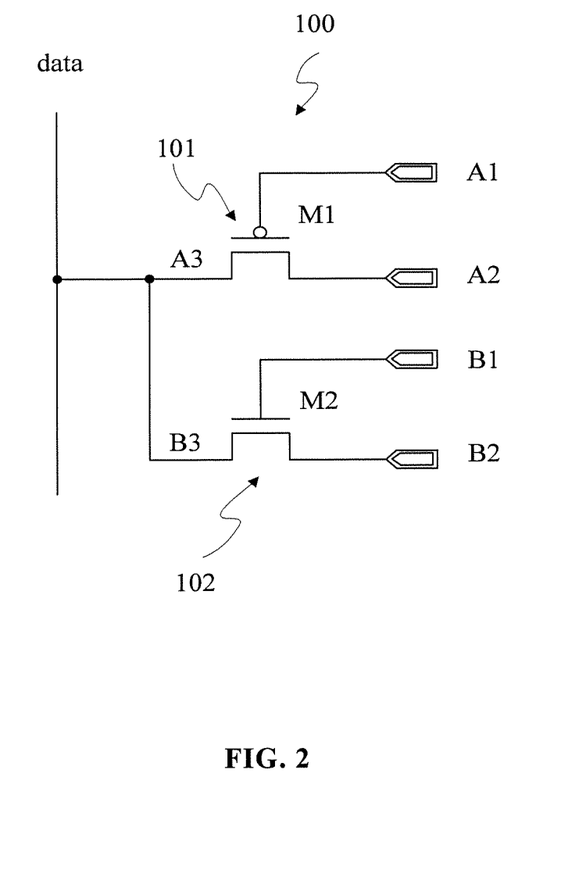
FIG. 2 is a schematic diagram of the specific structure of a panel function test circuit according to an exemplary embodiment.

Referring to FIG. 2, a more specific schematic diagram of the panel function test circuit 100 is provided. In this exemplary embodiment, the first subcircuit 101 is a first transistor M1 and the second subcircuit 102 is a second transistor M2. In FIG. 2, by way of illustration and not by way of limitation, the first subcircuit 101 is illustrated as a PMOS transistor and the second subcircuit 102 is illustrated as an NMOS transistor. In other exemplary embodiments, the first subcircuit 101 and the second subcircuit 102 could be any type of transistors known in the art.

A gate of the first transistor M1 is the first terminal A1 of the first subcircuit 101, a source of the first transistor M1 is the second terminal A2 of the first subcircuit 101, and a drain of the first transistor M1 is the third terminal A3 of the first subcircuit 101.

A gate of the second transistor M2 is the first terminal B1 of the second subcircuit 102, a source of the second transistor M2 is the second terminal B2 of the second subcircuit 102, and a drain of the second transistor M2 is the third terminal B3 of the second subcircuit 102.

In this embodiment, the first subcircuit 101 is the first transistor M1 and the second subcircuit 102 is the second transistor M2. In this manner, the panel function test circuit 100 can be easily implemented and has a simple structure.

Figure 3:
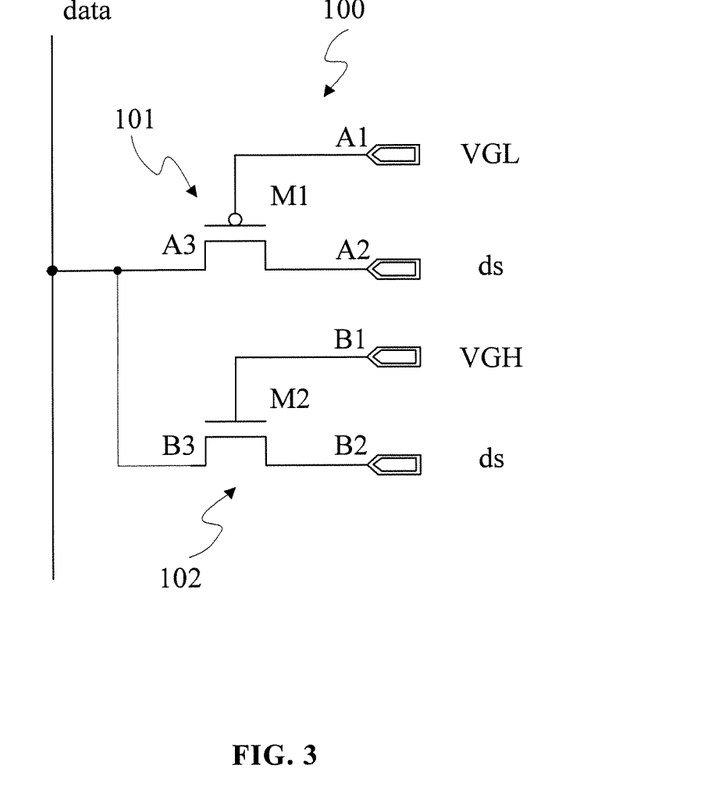
FIG. 3 is a schematic diagram of a panel function test circuit, according to an exemplary embodiment, being used to perform a function test of a display panel.

Referring to FIG. 3, the panel function test circuit 100 being used to perform a function test of a display panel is illustrated. By way of example, and not by way of limitation, the first subcircuit 101 is the first transistor M1 wherein the first transistor M1 is a PMOS transistor, and the second subcircuit 102 is the second transistor M2 wherein the second transistor M2 is an NMOS transistor.

Both the drain (the third terminal A3 of the first subcircuit 101) of the first transistor M1 and the drain (the third terminal B3 of the second subcircuit 102) of the second transistor M2 connect electrically with the same data line data of the display panel.

A low level signal VGL is accessed through the gate (the first terminal A1 of the first subcircuit 101) of the first transistor M1, and a first test signal ds is accessed through the source (the second terminal A2 of the first subcircuit 101) of the first transistor M1. In this case, the first transistor M1 is switched on, accordingly providing the test signal ds to the data line data.

A high level signal VGH is accessed through the gate (the first terminal B1 of the second subcircuit 102) of the second transistor M2, and a second test signal ds is accessed through the source (the second terminal B2 of the second subcircuit 102) of the second transistor M2. In this case, the second transistor M2 is switched on, accordingly providing the test signal ds to the data line data.

That is to say, the first subcircuit 101 and the second subcircuit 102 may provide the same test signal ds to the same data line data simultaneously. Based on the principle of testing the display panel according to this exemplary embodiment, when the function test is performed for the display panel, either the first subcircuit 101 or the second subcircuit 102 may be utilized, which is not further described to avoid repetition.

In at least some of the above exemplary embodiments, the first control signal is a low level signal, and the second control signal is a high level signal; and the first level signal is a high level signal, and the second level signal is a low level signal.

Figure 4:
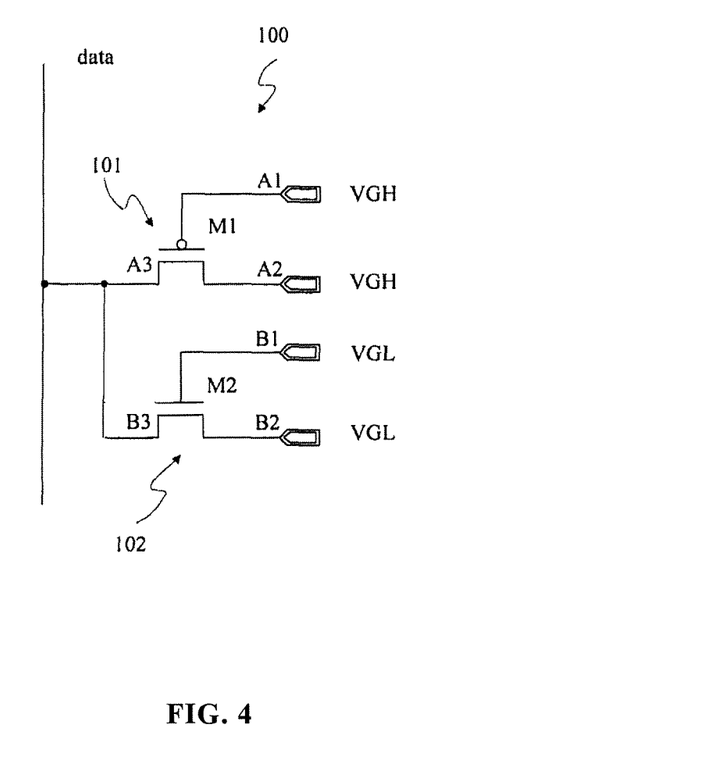
FIG. 4 is a schematic diagram of a panel function test circuit, according to an exemplary embodiment, being used to perform electrostatic protection.

Referring to FIG. 4, the panel function test circuit 100 being used to perform electrostatic protection of a display panel is illustrated. By way of example, and not by way of limitation, the first subcircuit 101 is the first transistor M1 wherein the first transistor M1 is a PMOS transistor, and the second subcircuit 102 is the second transistor M2 wherein the second transistor M2 is an NMOS transistor.

A high level signal VGH, for example a +5V level signal, is accessed through both the gate (the first terminal A1 of the first subcircuit 101) of the first transistor M1 and the source (the second terminal A2 of the first subcircuit 101) of the first transistor M1. The high level signal accessed through the gate of the first transistor M1 and the high level signal accessed through the source of the first transistor M1 may be the same or different. In some exemplary embodiments, the same high level signal is applied for simplifying the implementation.

A low level signal VGL, for example a −5V level signal, is accessed through both the gate (the first terminal B1 of the second subcircuit 102) of the second transistor M2 and the source (the second terminal B2 of the second subcircuit 102) of the second transistor M2. The low level signal accessed through the gate of the second transistor M2 and the low level signal accessed through the source of the second transistor M2 may be the same or different. In some exemplary embodiments, the same low level signal is applied for simplifying the implementation.

For example, when there is a high level electrostatic signal of +50V on the data line data, the drain voltage of the first transistor M1 is +50V, which is higher than the gate voltage of +5V, i.e., the gate circuit has a negative voltage compared to that of the drain circuit. Accordingly, the first transistor M1 is switched on, and thus the first transistor M1 performs discharge of the high level electrostatic signal.

Also for example, when there is a low level electrostatic signal of −50V on the data line data, the drain voltage of the second transistor M2 is −50V, which is lower than the gate voltage of −5V, i.e., the gate circuit has a positive voltage compared to that of the drain circuit. Accordingly, the second transistor M2 is switched on, and thus the second transistor M2 performs discharge of the low level electrostatic signal.

An exemplary embodiment of the present invention provides a display panel, which includes a plurality of data lines and a panel function test circuit as described above.

These exemplary embodiments of the present invention are advantageous in that they combine a panel function test circuit and an electrostatic protection circuit, which allows the panel function test circuit to also provide electrostatic protection, according to a change of the input signal, during normal operation of the display panel, which reduces the number of necessary components and corresponding wiring, and thus reduces the overall space required.

An exemplary embodiment of the present invention provides a function test method for a display panel, which adopts the panel function test circuit as described above and includes: inputting a first control signal through a first terminal of the first subcircuit, inputting a first test signal through a second terminal of the first subcircuit, and providing a test signal for the data line of the display panel through a third terminal of the first subcircuit; and/or, inputting a second control signal through a first terminal of the second subcircuit, inputting a second test signal through a second terminal of the second subcircuit, and providing the test signal for the data line of the display panel through a third terminal of the second subcircuit.

According to an exemplary embodiment, the first subcircuit is a PMOS transistor, and the steps of inputting the first control signal through the first terminal of the first subcircuit, inputting the first test signal through the second terminal of the first subcircuit, and providing the test signal for the data line of the display panel through the third terminal of the first subcircuit correspond to inputting the first control signal through a gate of the PMOS transistor, inputting the first test signal through a source of the PMOS transistor, and providing the test signal for the data line of the display panel through a drain of the PMOS transistor, respectively.

According to another exemplary embodiment, the second subcircuit is an NMOS transistor, and the steps of inputting the second control signal through the first terminal of the second subcircuit, inputting the second test signal through the second terminal of the second subcircuit, and providing the test signal for the data line of the display panel through the third terminal of the second subcircuit correspond to inputting the second control signal through a gate of the NMOS transistor, inputting the second test signal through a source of the NMOS transistor, and providing the test signal for the data line of the display panel through a drain of the NMOS transistor, respectively.

According to yet another exemplary embodiment, the first control signal is a low level signal, and the second control signal is a high level signal.

These exemplary embodiments of the present invention are advantageous because the panel function test circuit provides both function test and electrostatic protection functionality, and both the first subcircuit and the second subcircuit may provide the test signal when the function test is performed for the display panel, such that there is no need to provide a separate panel function test circuit, which reduces the number of needed components and corresponding wiring space.

Figure 5:
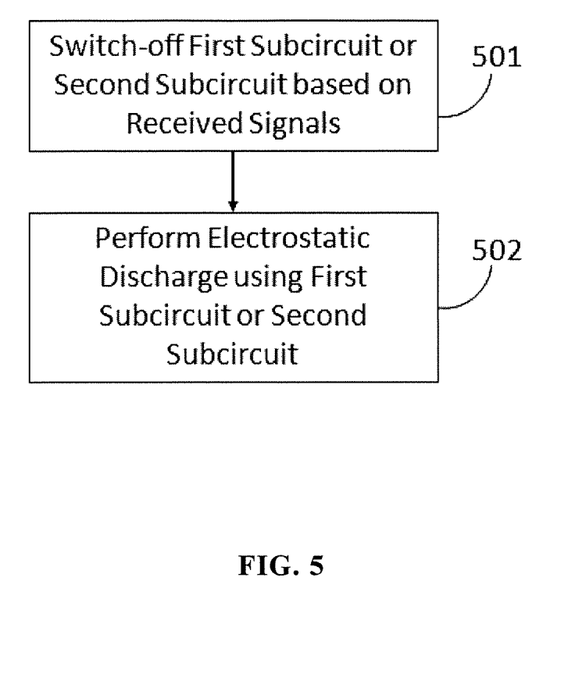
FIG. 5 is a flowchart showing an electrostatic protection method, according to an exemplary embodiment.

Referring to FIG. 5, an electrostatic protection method for a display panel, according to an exemplary embodiment, is shown, which adopts a panel function test circuit as described above. In step 501, a second control signal for controlling switch-off of the first subcircuit of the panel function test circuit is input through a first terminal of the first subcircuit, and a first level signal is input through a second terminal of the first subcircuit; and, a first control signal for controlling switch-off of the second subcircuit is input through a first terminal of the second subcircuit, and a second level signal is input through a second terminal of the second subcircuit. In step 502, the first subcircuit or the second subcircuit performs electrostatic discharge for an electrostatic signal, when the electrostatic signal arrives through the data line.

According to an exemplary embodiment, the first subcircuit is a PMOS transistor, the second subcircuit is an NMOS transistor; the first control signal is a low level signal, and the second control signal is a high level signal; and the first level signal is a high level signal, and the second signal is a low level signal.

According to another exemplary embodiment, the step of the first subcircuit or the second subcircuit performing electrostatic discharge for the electrostatic signal, when the electrostatic signal arrives through the data line (i.e., step 502) includes that the first subcircuit performs electrostatic discharge of the electrostatic signal, if the electrostatic signal is a high level electrostatic signal and the level of the electrostatic signal is higher than the level of the second control signal; and the second subcircuit performs electrostatic discharge for the electrostatic signal, if the electrostatic signal is a low level electrostatic signal and the level of the electrostatic signal is lower than the level of the first control signal.

The exemplary embodiments of the present invention are advantageous because the panel function test circuit has both function test and electrostatic protection functionality, and the first subcircuit and the second subcircuit provide, respectively, positive electrostatic discharge and negative electrostatic discharge when the display panel is in the work state, such that there is no need to provide a separate electrostatic protection circuit, thereby reducing the number of needed components and corresponding wiring space.

It is apparent that those skilled in the art could make various modifications and variations to the present invention without departing from the spirit and scope of the general inventive concepts. Accordingly, the present invention is also intended to include all such modifications and variations, as well as equivalents thereof.

The invention claimed is:

1. A panel function test circuit, comprising a first subcircuit and a second subcircuit electrically connected to a data line of a display panel,
   wherein the first subcircuit and the second subcircuit are operable to provide a test signal to the data line when the display panel is in a test state, and perform electrostatic discharge of an electrostatic signal transferred through the data line when the display panel is in a work state;
   wherein the first subcircuit has a first terminal, a second terminal, and a third terminal;
   wherein the second subcircuit has a first terminal, a second terminal, and a third terminal;
   wherein the first subcircuit is operable to provide the test signal to the data line through its third terminal based on a first control signal accessed through its first terminal and a first test signal accessed through its second terminal;
   wherein the first subcircuit is operable to perform discharge of a high level electrostatic signal transferred through the data line and received through its third terminal based on a second control signal accessed through its first terminal and a first level signal accessed through its second terminal;
   wherein the second subcircuit is operable to provide the test signal to the data line through its third terminal based on the second control signal accessed through its first terminal and a second test signal accessed through its second terminal; and
   wherein the second subcircuit is operable to perform discharge of a low level electrostatic signal transferred through the data line and received through its third terminal based on the first control signal accessed through its first terminal and a second level signal accessed through its second terminal.

2. The panel function test circuit of claim 1, wherein the first subcircuit comprises a first transistor;
   wherein the second subcircuit comprises a second transistor;
   wherein a gate of the first transistor is the first terminal of the first subcircuit, a source of the first transistor is the second terminal of the first subcircuit, and a drain of the first transistor is the third terminal of the first subcircuit; and
   wherein a gate of the second transistor is the first terminal of the second subcircuit, a source of the second transistor is the second terminal of the second subcircuit, and a drain of the second transistor is the third terminal of the second subcircuit.

3. The panel function test circuit of claim 2, wherein the first transistor is a PMOS transistor; and
   wherein the second transistor is an NMOS transistor.

4. The panel function test circuit of claim 3, wherein the first control signal is a low level signal;
   wherein the second control signal is a high level signal;
   wherein the first level signal is a high level signal; and
   wherein the second level signal is a low level signal.

5. A display panel comprising a data line and a panel function test circuit electrically connected to the data line,
   wherein the panel function test circuit comprises a first subcircuit and a second subcircuit electrically connected to a data line of a display panel,
   wherein the first subcircuit and the second subcircuit are operable to provide a test signal to the data line when the display panel is in a test state, and perform electrostatic discharge of an electrostatic signal transferred through the data line when the display panel is in a work state;
   wherein the first subcircuit has a first terminal, a second terminal, and a third terminal;
   wherein the second subcircuit has a first terminal, a second terminal, and a third terminal;
   wherein the first subcircuit is operable to provide the test signal to the data line through its third terminal based on a first control signal accessed through its first terminal and a first test signal accessed through its second terminal;
   wherein the first subcircuit is operable to perform discharge of a high level electrostatic signal transferred through the data line and received through its third terminal based on a second control signal accessed through its first terminal and a first level signal accessed through its second terminal;
   wherein the second subcircuit is operable to provide the test signal to the data line through its third terminal based on the second control signal accessed through its first terminal and a second test signal accessed through its second terminal; and
   wherein the second subcircuit is operable to perform discharge of a low level electrostatic signal transferred through the data line and received through its third terminal based on the first control signal accessed through its first terminal and a second level signal accessed through its second terminal.

6. A function test method for a display panel comprising a data line and a panel function test circuit including a first subcircuit and a second subcircuit electrically connected to the data line, wherein the first subcircuit and the second subcircuit are operable to provide a test signal to the data line when the display panel is in a test state, and perform electrostatic discharge of an electrostatic signal transferred through the data line when the display panel is in a work state,
   the method comprising at least one of:
   (1) inputting a first control signal through a first terminal of the first subcircuit, inputting a first test signal through a second terminal of the first subcircuit, and providing the test signal for the data line of the display panel through a third terminal of the first subcircuit; and
   (2) inputting a second control signal through a first terminal of the second subcircuit, inputting a second test signal through a second terminal of the second subcircuit, and providing the test signal for the data line of the display panel through a third terminal of the second subcircuit.

7. The function test method of claim 6, wherein the first subcircuit is a PMOS transistor, and
wherein the steps of inputting the first control signal through the first terminal of the first subcircuit, inputting the first test signal through the second terminal of the first subcircuit, and providing the test signal to the data line of the display panel through the third terminal of the first subcircuit correspond to inputting the first control signal through a gate of the PMOS transistor, inputting the first test signal through a source of the PMOS transistor, and providing the test signal to the data line of the display panel through a drain of the PMOS transistor, respectively.

8. The function test method of claim 6, wherein the second subcircuit is an NMOS transistor, and
wherein the steps of inputting the second control signal through the first terminal of the second subcircuit, inputting the second test signal through the second terminal of the second subcircuit, and providing the test signal to the data line of the display panel through the third terminal of the second subcircuit correspond to inputting the second control signal through a gate of the NMOS transistor, inputting the second test signal through a source of the NMOS transistor, and providing the test signal to the data line of the display panel through a drain of the NMOS transistor, respectively.

9. The function test method of claim 6, wherein the first control signal is a low level signal; and
wherein the second control signal is a high level signal.

10. An electrostatic protection method for a display panel comprising a data line and a panel function test circuit including a first subcircuit and a second subcircuit electrically connected to the data line, wherein the first subcircuit and the second subcircuit are operable to provide a test signal to the data line when the display panel is in a test state, and perform electrostatic discharge of an electrostatic signal transferred through the data line when the display panel is in a work state, the method comprising:
inputting a second control signal for controlling switch-off of the first subcircuit of the panel function test circuit through a first terminal of the first subcircuit, and inputting a first level signal through a second terminal of the first subcircuit;
inputting a first control signal for controlling switch-off of the second subcircuit through a first terminal of the second subcircuit, and inputting a second level signal through a second terminal of the second subcircuit; and
performing, by one of the first subcircuit and the second subcircuit, electrostatic discharge of an electrostatic signal, when the electrostatic signal arrives through the data line.

11. The electrostatic protection method of claim 10, wherein the first subcircuit is a PMOS transistor;
wherein the second subcircuit is an NMOS transistor;
wherein the first control signal is a low level signal;
wherein the second control signal is a high level signal;
wherein the first level signal is a high level signal; and
wherein the second level signal is a low level signal.

12. The electrostatic protection method of claim 11, wherein the step of performing, by one of the first subcircuit and the second subcircuit, electrostatic discharge of the electrostatic signal, when the electrostatic signal arrives through the data line comprises:
performing, by the first subcircuit, electrostatic discharge of the electrostatic signal, if the electrostatic signal is a high level electrostatic signal, and the level of the electrostatic signal is higher than the level of the second control signal; and
performing, by the second subcircuit, electrostatic discharge of the electrostatic signal, if the electrostatic signal is a low level electrostatic signal, and the level of the electrostatic signal is lower than the level of the first control signal.

* * * * *